US008078982B2

(12) United States Patent
Fried et al.

(10) Patent No.: US 8,078,982 B2
(45) Date of Patent: Dec. 13, 2011

(54) AUTOMATIC CREATION OF DATA RELATIONSHIPS

(75) Inventors: Jeffrey Caldwell Fried, Foster City, CA (US); Geoff Schuller, San Jose, CA (US); John Lorin Welshofer, Sunnyvale, CA (US); Steven Marcek, Mountain View, CA (US); Brian Barrick, Foster City, CA (US)

(73) Assignee: Apple Inc., Cupertino, CA (US)

( * ) Notice: Subject to any disclaimer, the term of this patent is extended or adjusted under 35 U.S.C. 154(b) by 944 days.

(21) Appl. No.: 11/938,749

(22) Filed: Nov. 12, 2007

(65) Prior Publication Data

US 2009/0125828 A1    May 14, 2009

(51) Int. Cl.
*G06F 3/00* (2006.01)
*G06F 17/30* (2006.01)
(52) U.S. Cl. ........ 715/769; 715/803; 715/765; 707/803; 707/805
(58) Field of Classification Search .................. 715/764, 715/765, 769, 781, 803, 804, 805, 808, 809, 715/810; 707/1, 100, 705, 802, 803; 709/217
See application file for complete search history.

(56) References Cited

U.S. PATENT DOCUMENTS

| | | | | |
|---|---|---|---|---|
| 5,546,526 | A * | 8/1996 | Li et al. ........................ | 715/837 |
| 5,950,190 | A * | 9/1999 | Yeager et al. .................. | 1/1 |
| 7,246,344 | B1 * | 7/2007 | Christensen et al. ........ | 717/109 |
| 7,437,676 | B1 * | 10/2008 | Magdum et al. ............. | 715/738 |
| 2002/0161772 | A1 * | 10/2002 | Bergelson et al. ............ | 707/100 |
| 2002/0186257 | A1 * | 12/2002 | Cadiz et al. ................... | 345/838 |
| 2003/0167213 | A1 * | 9/2003 | Jammes et al. ................ | 705/27 |
| 2004/0135815 | A1 * | 7/2004 | Browne et al. ............... | 345/810 |
| 2006/0200753 | A1 * | 9/2006 | Bhatia et al. .................. | 715/505 |
| 2007/0300172 | A1 * | 12/2007 | Runge et al. .................. | 715/764 |
| 2008/0034315 | A1 * | 2/2008 | Langoulant et al. .......... | 715/780 |
| 2008/0052372 | A1 * | 2/2008 | Weber et al. .................. | 709/217 |
| 2008/0244510 | A1 * | 10/2008 | Cote ............................. | 717/108 |

* cited by examiner

*Primary Examiner* — Xiomar L Bautista
(74) *Attorney, Agent, or Firm* — Fish & Richardson P.C.

(57) ABSTRACT

The disclosed implementations allow automatic and transparent creation of data relationships in a database application or other application in response to user generated trigger events. Related data records can be stored and displayed in layouts, screens, forms and user interfaces provided by the database application or other application. Additional or extended information corresponding to the related data can be stored and displayed.

25 Claims, 16 Drawing Sheets

FIG. 9

Events

Table | Form

Title: John and Jane's Wedding
Date: 10/27/2008
Start Time: 12:30 PM
End Time: 6:30 PM

| First Name | Last Name | Phone Number | RSVP | Gift Given |
|---|---|---|---|---|
| Maria | Garza | 415 555-5150 | ✓ | Toaster |
| Mary | Jones | 408 555-5234 | ☐ | Oven Mitts |
| Penelope | Lanza | 330 555-5321 | ✓ | Food Chopper |
| Todd | Smith | 408 555-5999 | ☐ | $300 |
| Ali | Spanita | 650 555-5111 | ✓ | Trivet Set |

FIG. 10

Join-Contacts-Events

| (ID) | Contacts ID | Events ID | RSVP | Gift Given |
|---|---|---|---|---|
| 1 | 1 | 1 | yes | Toaster |
| 2 | 2 | 1 | | Oven Mittens |
| 3 | 3 | 1 | yes | Cuisinart |
| 4 | 4 | 1 | yes | BBB $60 Gift Card |
| 5 | 5 | 1 | | Trivet Set |
| 6 | 1 | 2 | | |
| 7 | 4 | 2 | | |
| 8 | 5 | 2 | | |

FIG. 13B

AUTOMATIC CREATION OF DATA RELATIONSHIPS

TECHNICAL FIELD

The subject matter of this application is generally related to relational databases.

BACKGROUND

A relational database is a set of relations or a database built in a Relational Database Management System (RDBMS). A typical relational database is a collection of tables and other items for organizing and structuring data, and for forcing the database to conform to a set of requirements. A RDBMS is a set of software programs that controls the organization, storage and retrieval of data in a database. A typical RDBMS includes a modeling language to define a schema (relational model) of each table stored in the RDBMS, according to the RDBMS data model. Data is typically organized into data structures (e.g., fields, records, files). A database query language and report writer can be used to interactively enter and update the database, as well as interrogate it.

Examples of RDBMSs include: Oracle®, Microsoft® SQL Server, MySQL® and FileMaker® Pro. FileMaker® Pro is a cross-platform database application that integrates a database engine with a graphical user interface for allowing users to modify a database by dragging new elements into layouts, screens and forms that provide the user interface.

While RDBMSs are capable of managing complicated data relationships, there is a steep learning curve associated with creating data relationships using such applications. Users who are not familiar with the features of the RDBMS, or simply want to create a relational database without opening a manual, may avoid using the RDBMS altogether, or hire a professional to create the relational database which may be too expensive for some users.

SUMMARY

The disclosed implementations allow automatic and transparent creation of data relationships in a database application or other application in response to user generated trigger events. Related data records can be stored and displayed in layouts, screens, forms and user interfaces provided by the database application or other application. Additional or extended information corresponding to the related data can be stored and displayed.

In one aspect, a user can drag and drop an object (e.g., an icon) representing a first data source into a layout, screen, form or other user interface element associated with a second data source. When the object is dropped, a related records list is displayed which the user can manually populate with data from the first data source using a variety of data population tools. Relationship information is automatically and transparently (transparent to the user) generated and stored in one or more background tables. The background tables allow the user to display data from the first data source in a layout, screen, form or other user interface element associated with the second data source and vice-versa.

The disclosed implementations advantageously allow users to relate two or more data sources and records directly without having to manually create relationships between the data sources and manage values that connect related records. Related data is intelligently utilized to display or otherwise present related records on either side of a data relationship. Additional or extended information that relates to two or more specific data values can be stored and displayed in layouts, screens, forms and other user interfaces of a database application or other application.

Other implementations are disclosed for automatic creation of data relationships, including implementations directed to systems, methods, apparatuses, computer-readable mediums and user interfaces.

DESCRIPTION OF DRAWINGS

FIGS. 8 and 9 are screen shots showing example operations that can be used to add additional fields to related records.

FIG. 10 is a screen shot showing an example user interface component displaying a record with the additional added fields.

FIG. 13B illustrates an example background table where additional fields have been added.

DETAILED DESCRIPTION

Database Application Overview

Figure 1A:
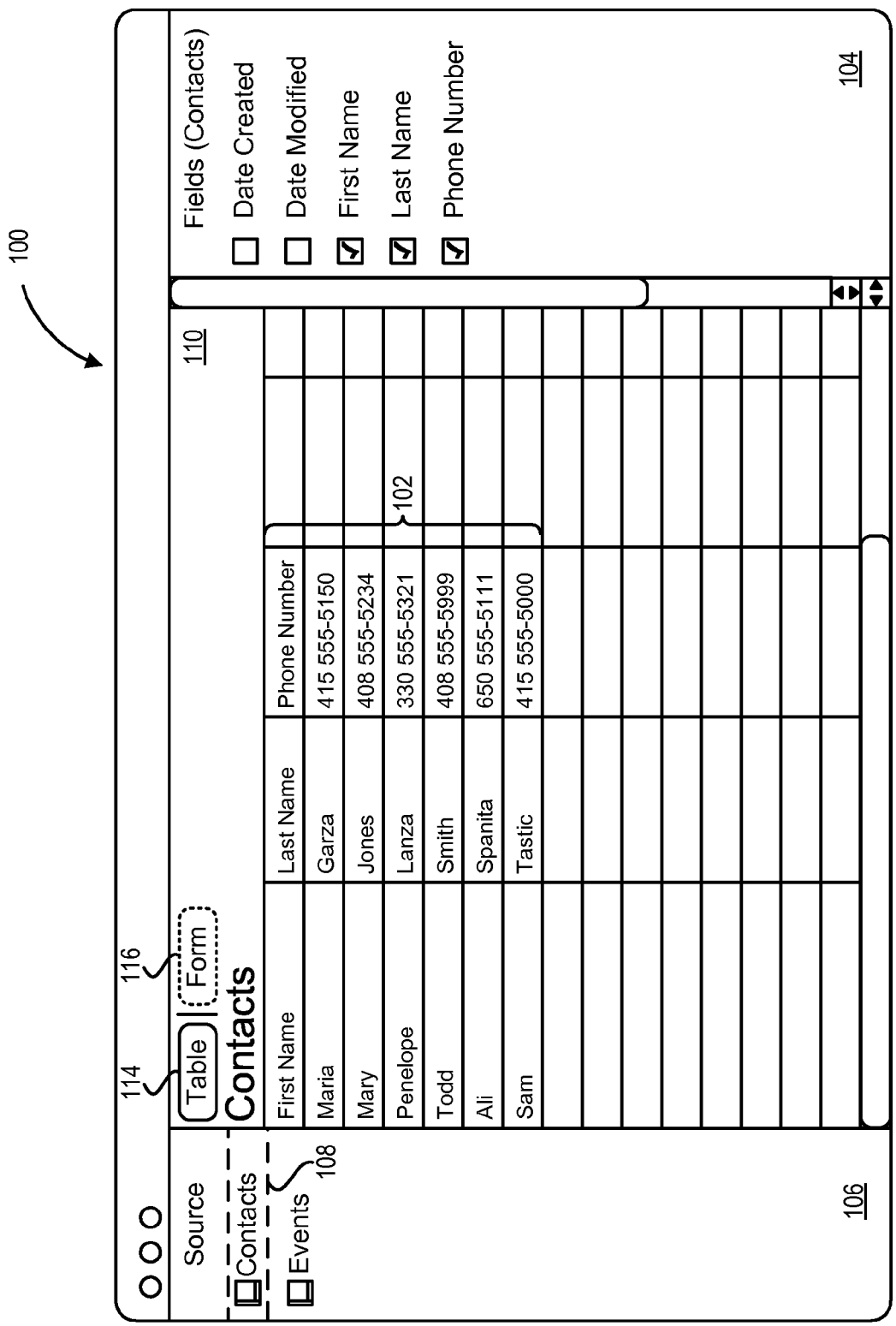
FIGS. 1A and 1B are screen shots showing an example application that can be used to present and manage data.
Figure 1B:
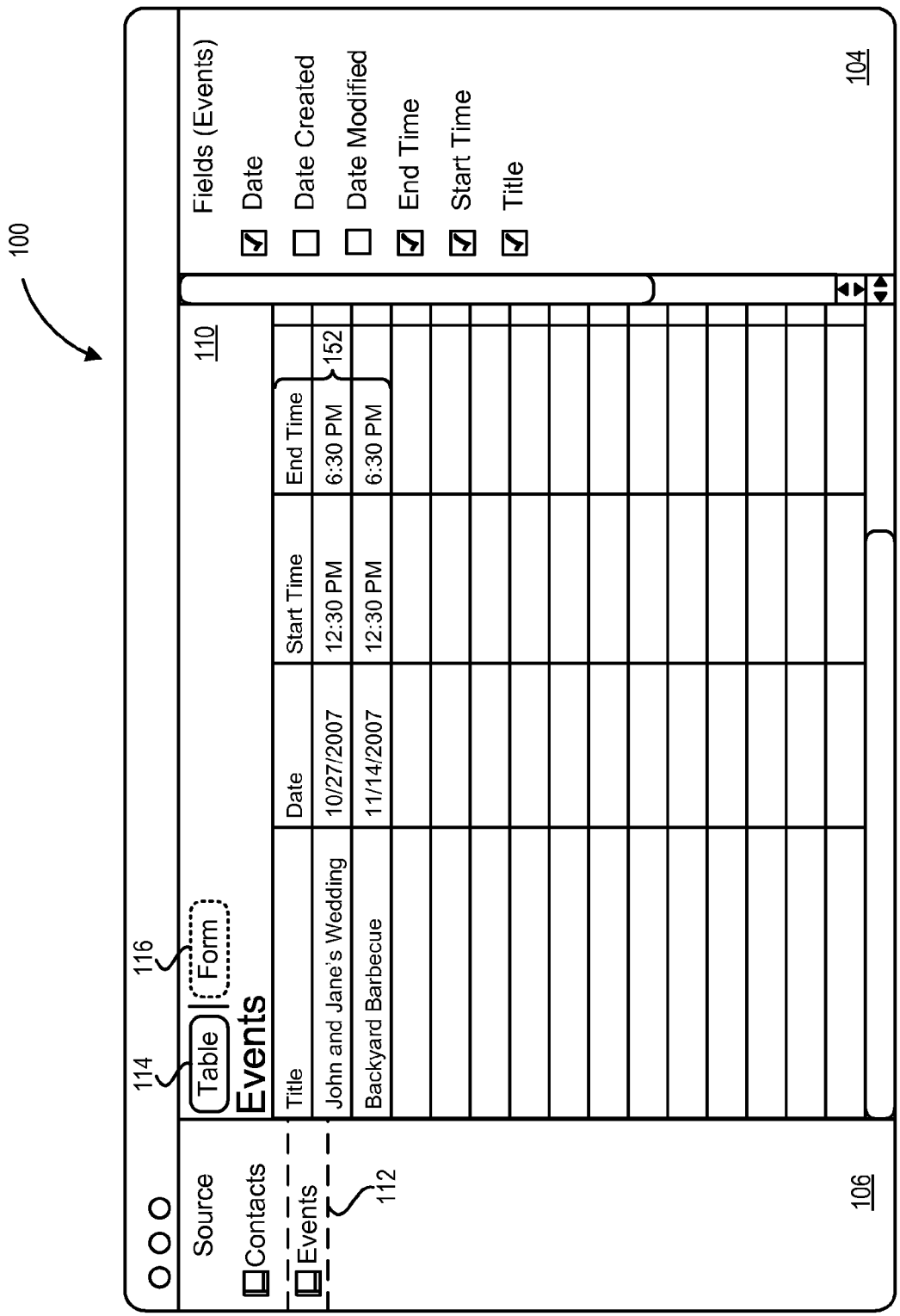

FIGS. 1A and 1B are screen shots showing an example application 100 that can be used to present and manage data. For example, contact information and event information can be presented as data 102 and 152 in FIGS. 1A and 1B, respectively. In some implementations, data can originate from a datastore, such as an external data source. Typically, data 102 and 152 are stored in a relational database. A relational database stores data in one or more tables. A table can include one or more records that can be further categorized into one or more fields. A field can specify relevant information for a record. For example, data 102 specifying one or more contacts can be stored in a contacts table. Each contact in the table can be represented as a record, and relevant information (e.g., first name, last name, and phone number) can be specified by the appropriate field. As another example, data 152 specifying one or more events can be stored in an events table.

In FIGS. 1A and 1B, the contacts and events are unrelated data because neither table includes information relating contacts and events. As described below, the application 100 can automatically and transparently relate unrelated data in response to user-generated trigger events or actions of a user (e.g., drag and drop actions or other user interface-based actions).

In some implementations, a user of the application 100 can modify the presentation of data. For example, the application 100 includes a user interface region (e.g., region 104) that allows the user to select which fields in the records of a particular table are displayed. In reference to FIG. 1A, the user can select one or more checkboxes in user interface region 104 to display fields for each record in the contacts table corresponding to date created, date modified, first name, last name, phone number, and combinations thereof. In the example shown, a first name, last name, and phone number are selected in user interface region 104 and the corresponding fields of the contacts table are presented as data 102.

The application 100 can also include a region 106 that allows the user to select from different data sources (e.g., source tables). As illustrated by FIG. 1A, if the user selects the contact data source (as shown by selection box 108), the contacts table is referenced and the contact data 102 is displayed in display area 110. As illustrated by FIG. 1B, if the user selects an events data source (as shown by selection box 112), the events table is referenced and the events data 152 is displayed in the display area 110.

In some implementations, the display area 110 can be modified by a table button 114 and a form button 116, respectively. For example, when the table button 114 is selected, the contents of the selected table can be displayed in a tabular format. As another example, as illustrated by FIGS. 2-7, when the form button 116 is selected, the contents of the selected record can be displayed as one or more values in a user interface form. Because the tables are referenced directly, any number of records, containing any number of fields can be referenced and displayed by the application 100. For example, the user can create a data source named "locations" that includes an address field, a name field, a phone number field, or any other fields. Similarly other data sources containing any number of fields can be generated as appropriate. In other words, the application 100 can parse an arbitrary database table and generate an appropriate representation containing the fields of the database table.

Automatic Creation of Data Relationships

FIGS. 2-5 are screen shots showing example operations that can be used to automatically and transparently relate data. In some implementations, the user of application 100 can use drag-and-drop or dialog-based functionality to automatically and transparently relate data. For example, when using drag-and drop functionality, the user can drag one set of data onto another set of data to generate relationships between the sets of data. As another example, when using dialog-based functionality, the user can generate relationships by creating a field that relates records from a second source with records in the current source. Because relationships are generated automatically and transparently, the user avoids the need to enter information directly into a data field or otherwise manually edit records of the database in order to relate specific records. In some implementations, the relationships can be created and maintained using database join operations (e.g., an SQL Join command). The database join operations can be used to create a new data structure for storing relationship information by joining two or more database tables, as described in reference to FIGS. 12 and 13.

Figure 2:
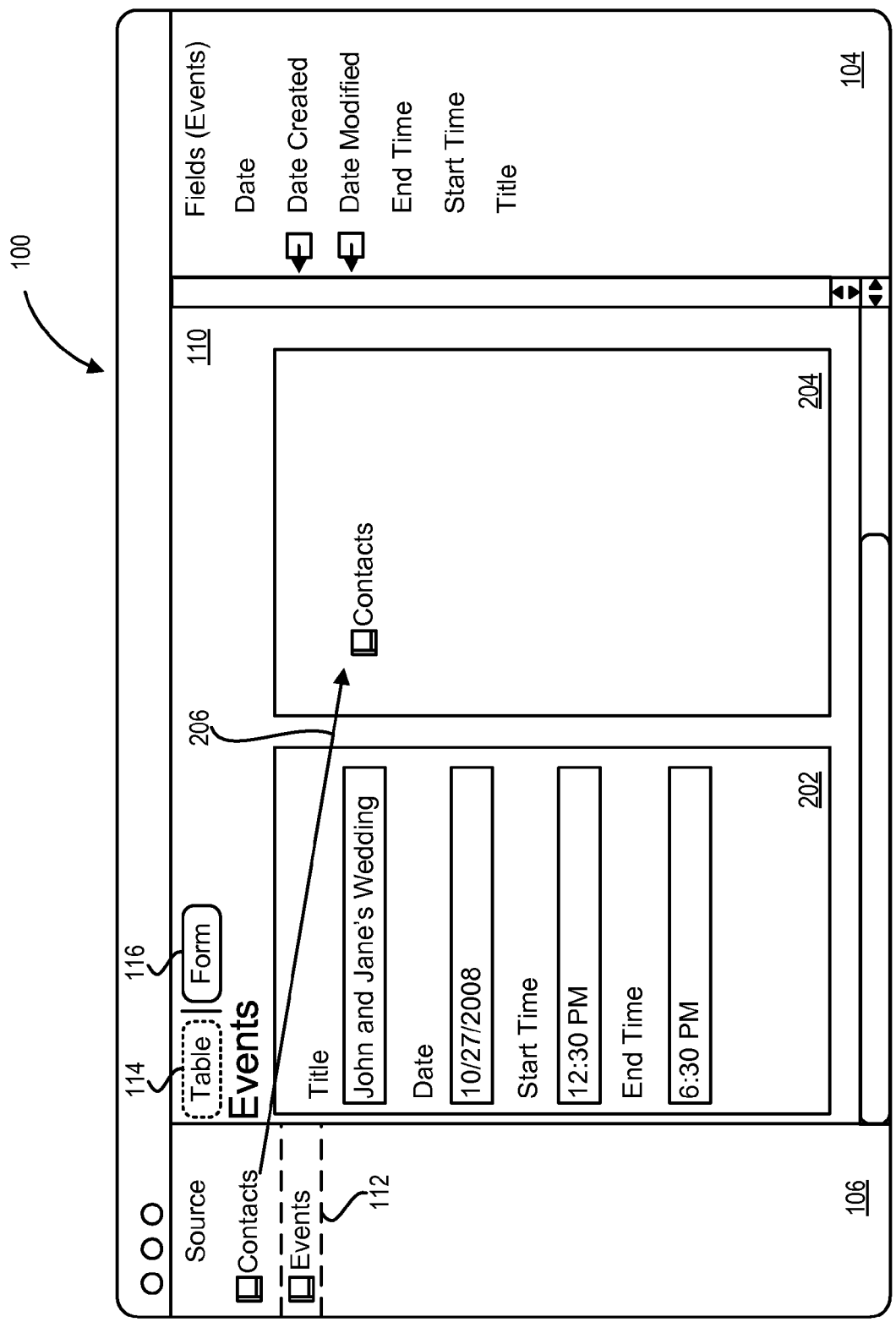
FIGS. 2-5 are screen shots showing example operations that can be used to automatically relate data.

FIG. 2 illustrates an example drag-and-drop operation. In some implementations, the user of the application 100 can select a form view by pressing the form button 116. The form view can include a user interface region 202 that displays information corresponding to a record. For example, the user interface region 202 can display the fields of a selected event. Additionally, the form view can include a user interface region 204 that allows the user to automatically generate relationships between two unrelated data sources, such as the contacts and events tables 102, 152 described in reference to FIGS. 1A and 1B. As illustrated by arrow 206, in some implementations the user can drag-and-drop an object (e.g., an icon or image) of the contacts data source onto the user interface region 204 which is part of the events form view.

Figure 3:
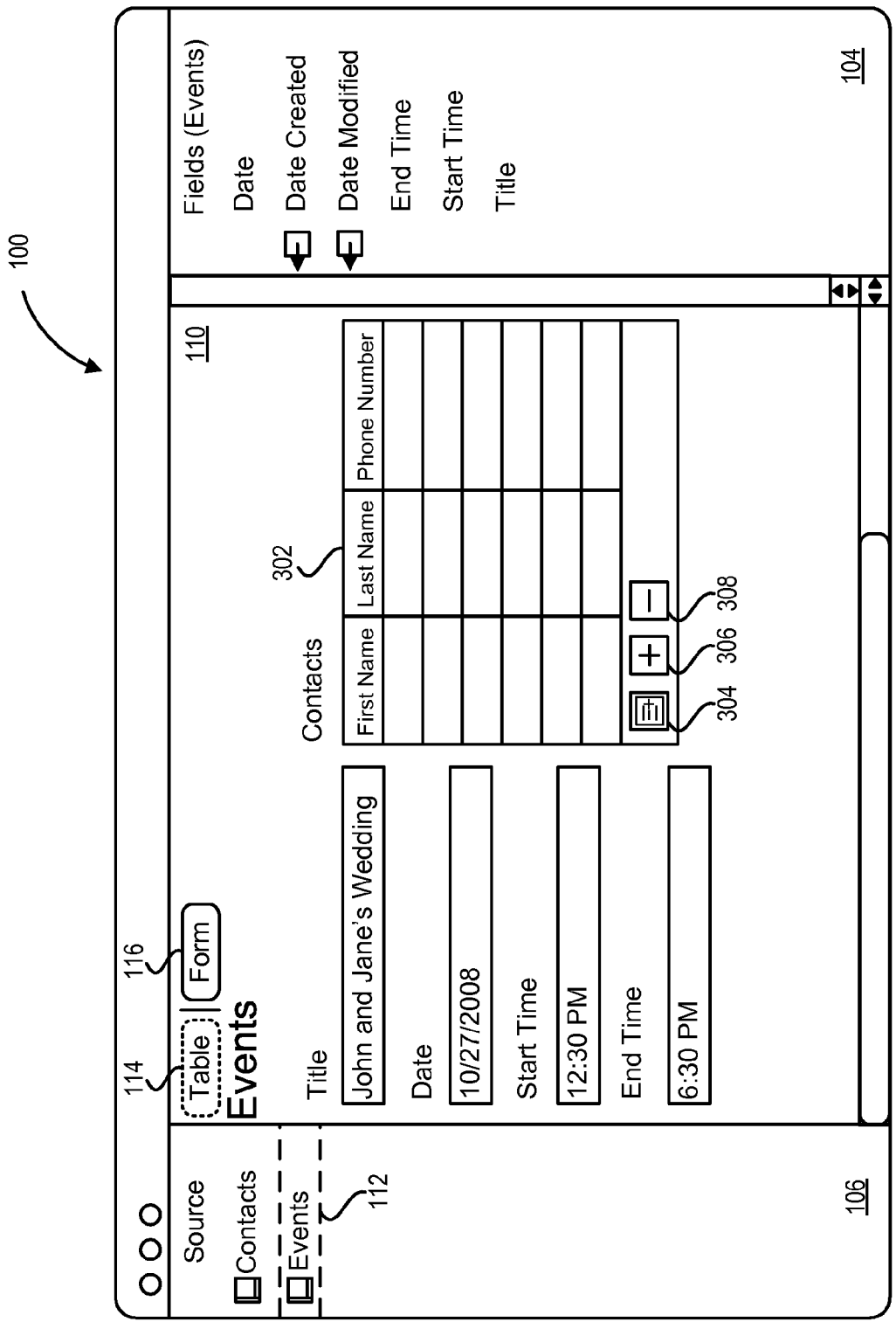

Referring to FIG. 3, after the user drags-and-drops the contacts data source onto the user interface region 204, the application 100 automatically generates and presents to the user a blank related records list 302 (e.g., the table named "Contacts") which stores a list of contact records that are related to the current event record. In some implementations, the list 302 includes buttons 304, 306 and 308 that allow the user to manipulate data in the list 302. For example, button 306 allows the user the user to add a contact to the list 302 and button 308 allows the user to remove a contact from the list 302.

In some implementations, if the user selects button 304, a user interface form 402 is generated, as illustrated by the arrow 404. The user interface form 402 displays available items from the appropriate data source. For example, the user interface form 402 displays the contacts in the contacts data source. The user interface form 402 allows the user to select one or more items (e.g., records) and add the items to the list 302, as illustrated by arrow 410. The user can select any number of records (e.g., the set of records 406) and click on the button 408 to add the selected records to the list 302. The user can also use a mouse or other pointing device to drag any number of records in user interface form 402 and drop the records onto the list 302. Adding records to the related records list automatically and transparently relates the data. In the example shown, the selected contacts 406 are automatically related to the currently selected event.

Figure 4:
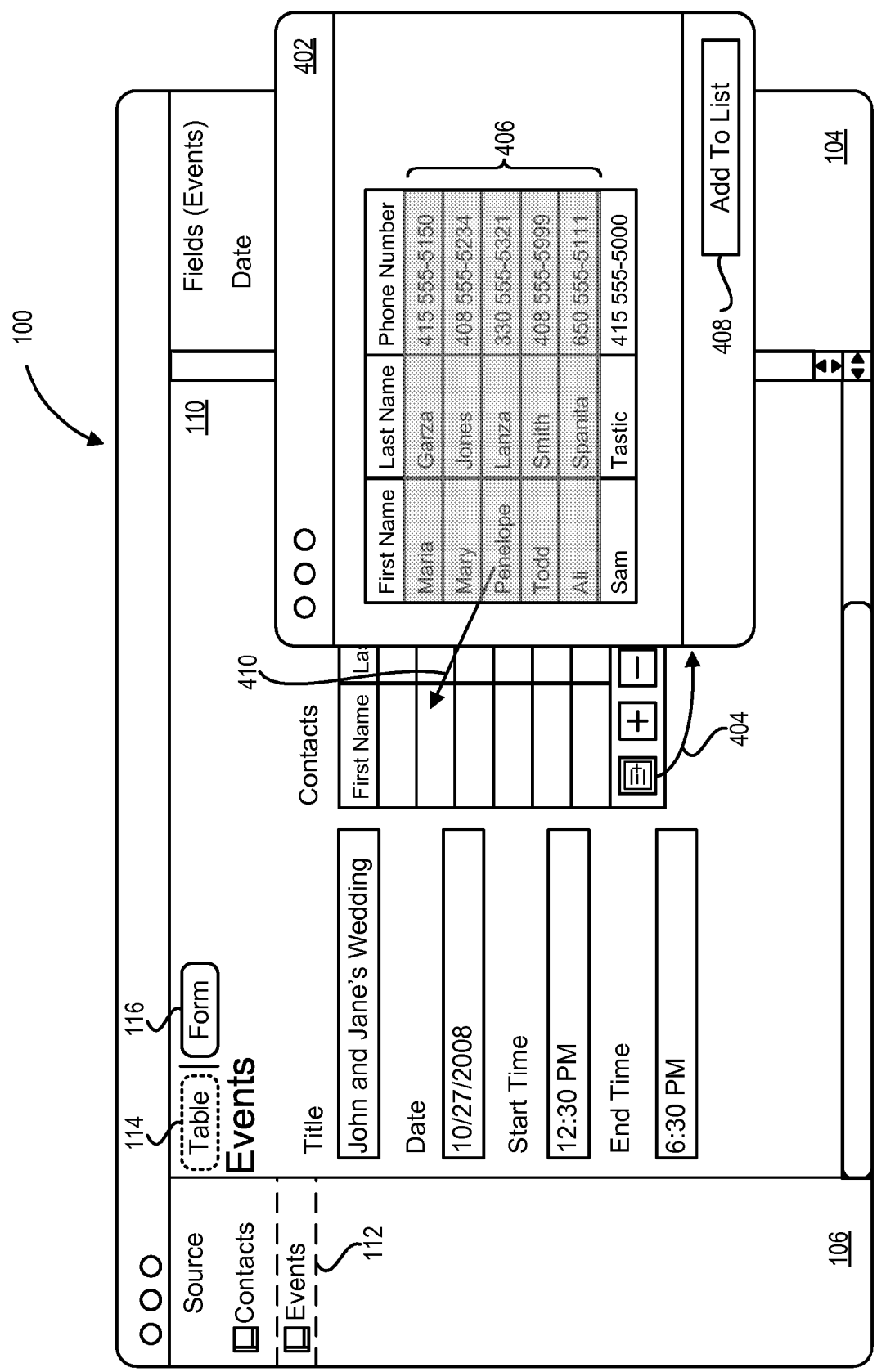
Figure 5:
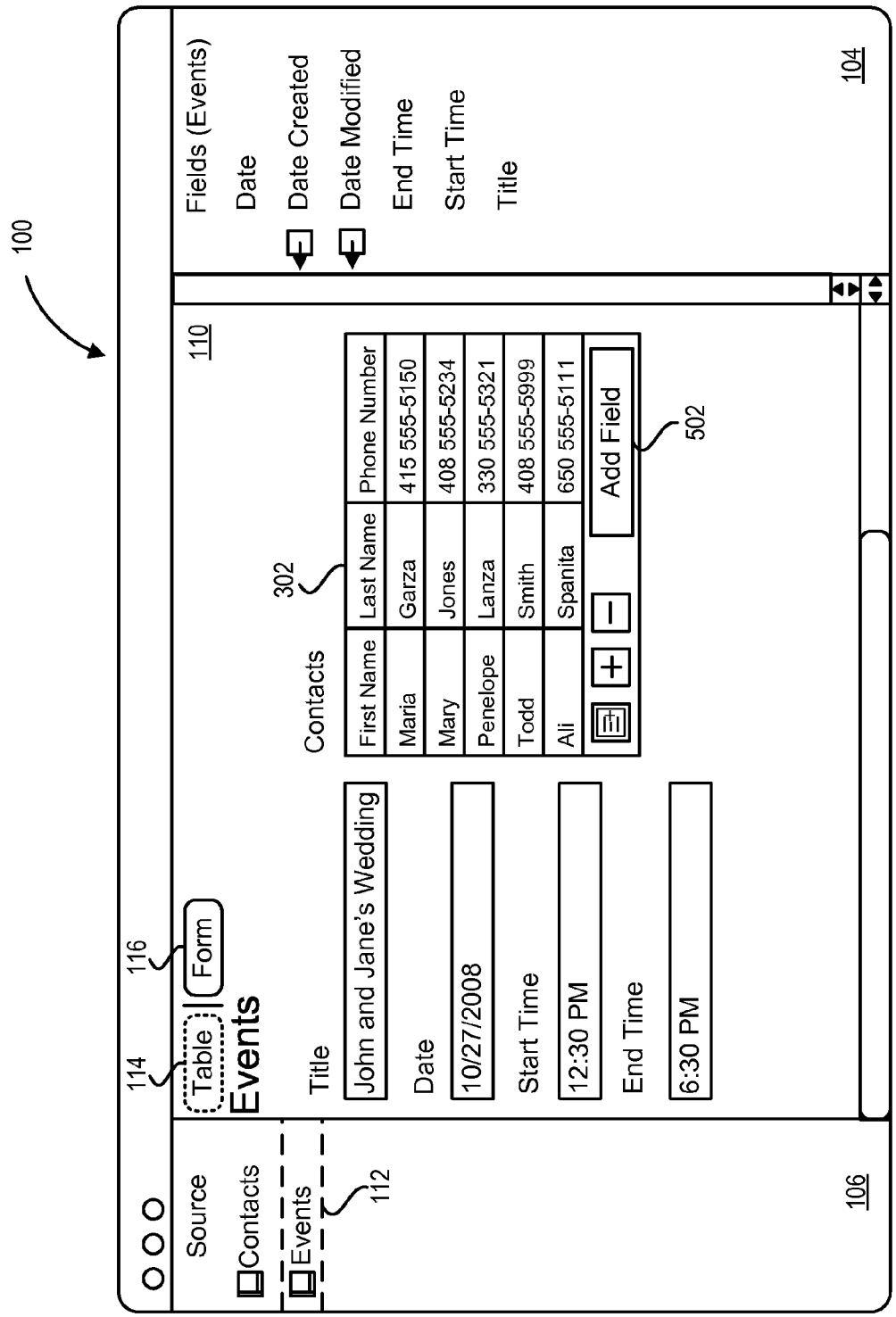

The user can view automatically generated relationships using the application 100. As illustrated by FIG. 5, the contacts added to the event are related to the event and thus can be displayed whenever event information is displayed. In the example shown, the added contacts are displayed in the list 302. Note that Sam Tastic was not selected in FIG. 4, so he was not added to the list 302 in FIG. 5. In addition, as illustrated by FIG. 5, an add field button 502 may be added to the related record list 302. The button 502 can be used to add additional fields to the related record list 302. Adding additional fields to a related records list is described in more detail in reference to FIGS. 8 and 9.

FIGS. 2-5 describe example operations that relate one or more contacts with a selected event. The application 100, however, is also capable of relating one or more events with a selected contact, as described in reference to FIGS. 6 and 7.

Examples of Bi-Directional Data Relationships

Figure 6:
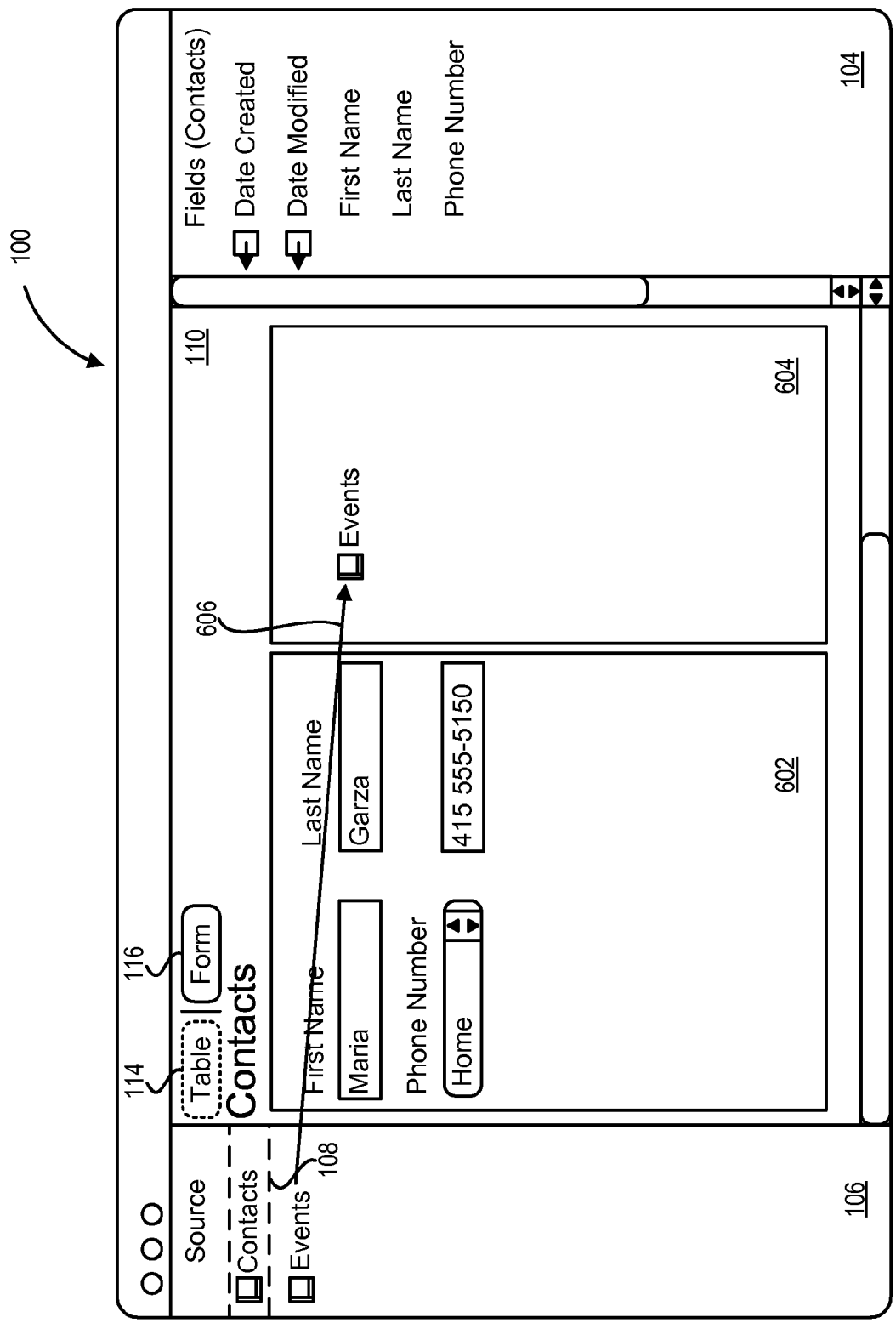
FIGS. 6 and 7 are screen shots showing example operations that can be used to automatically show related data.
Figure 7:
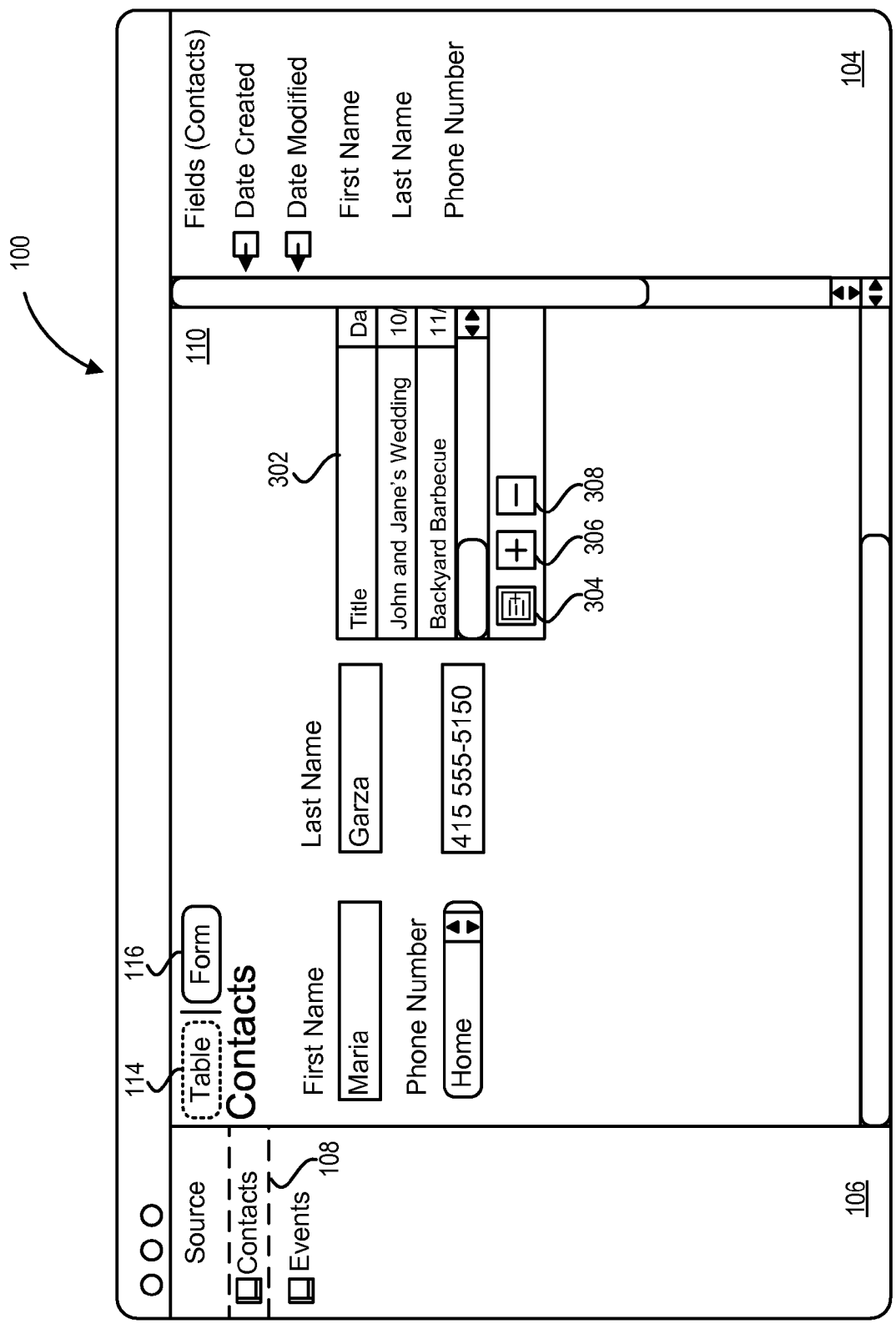

FIGS. 6 and 7 are screen shots showing example operations that can be used to automatically show related data. The examples described in reference to FIGS. 2-5 can automatically create related data. The application 100 also allows the user to view previously related data. In previous examples, contacts were related with events. For example, in reference to FIG. 4, the contact Maria Garza was added to the event John and Jane's Wedding. Moreover, a substantially similar set of steps as described in reference to FIGS. 4-5 can be used to add Maria Garza to the event Backyard Barbeque. As shown by FIGS. 6 and 7, this relationship is bi-directional. The user can select a data source and add it to the form (FIG. 6) and can view relationships that are associated with, or have been generated using, the selected data source (FIG. 7, which displays data that was related using steps like those shown in FIGS. 4-5). For example, the user can select the contacts data source (e.g., as illustrated by selection box 108), and select a contact record (not shown). The application 100 can then display the selected contact in user interface region 602. The user can then drag the events data source into the form 604, as illustrated by arrow 606. As illustrated by FIG. 7, the selected contact is displayed with the related events. For example, because contact Maria Garza was previously related to John and Jane's Wedding event and the Backyard Barbecue event, the respective events are displayed in related record list 302. As another example, if contact Todd Smith were selected, because he is only related to John and Jane's Wedding event (e.g., as illustrated by FIG. 4), Todd Smith's related record list 302 would include John and Jane's Wedding event, but not the Backyard Barbecue event.

In some implementations, the action of dragging-and-dropping the events data source onto the form generates a user interface component (e.g., list 302). The list 302 can then be populated with information corresponding to information related to the selected record. For example, the list 302 can include the events that the selected contact is already related to, either through the operations described in reference to FIGS. 2-5, or by using buttons 304, 306, or 308. The user can select button 304 (e.g., in reference to FIG. 7) and add additional events to the contact. This operation can display the contact as attending the event in the case that the user selects the event. For example, after the user selects the added event, the event can appear in the list 302 of the respective contact.

Examples of Adding Additional Information to Related Records

Figure 8:
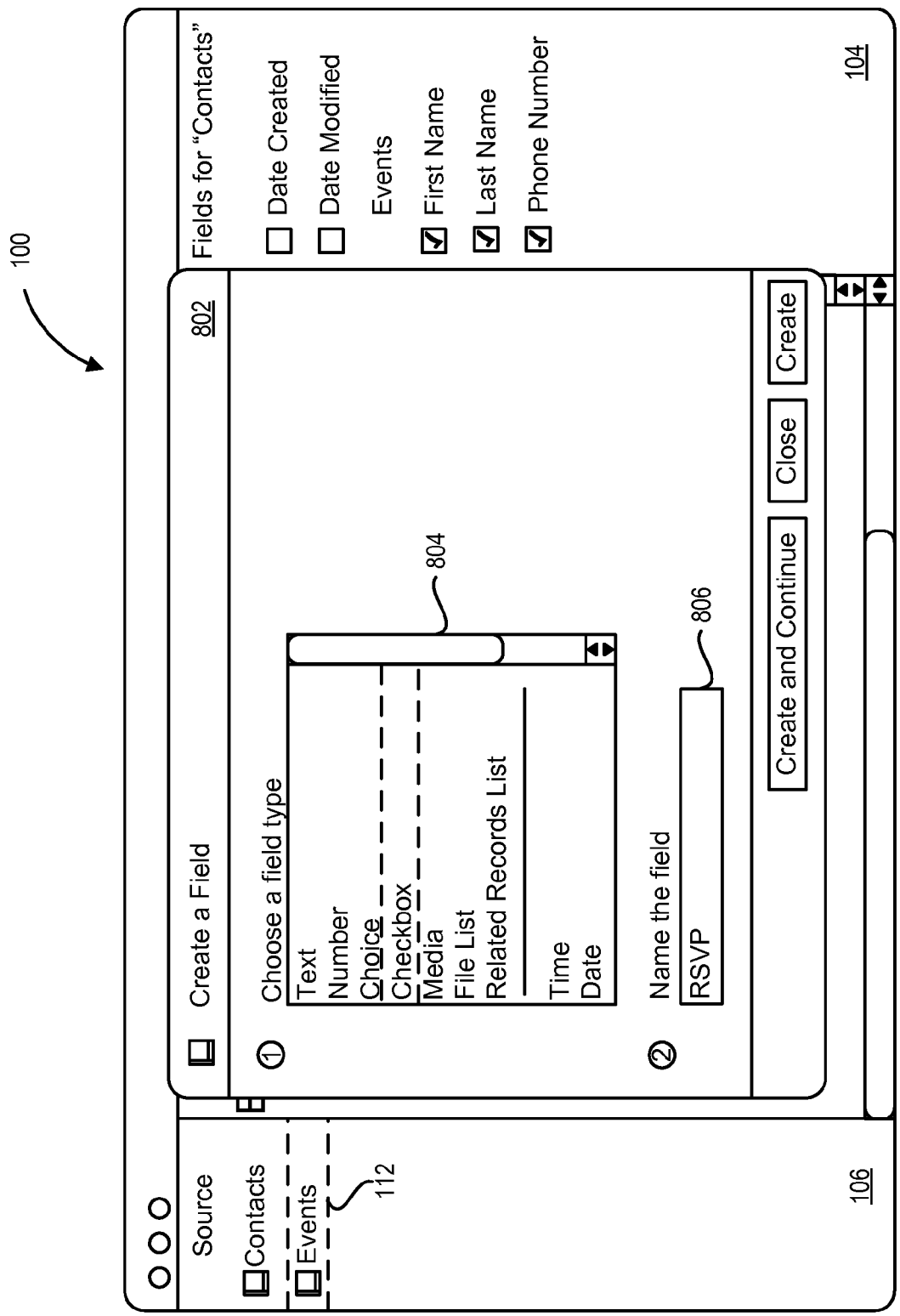
Figure 9:
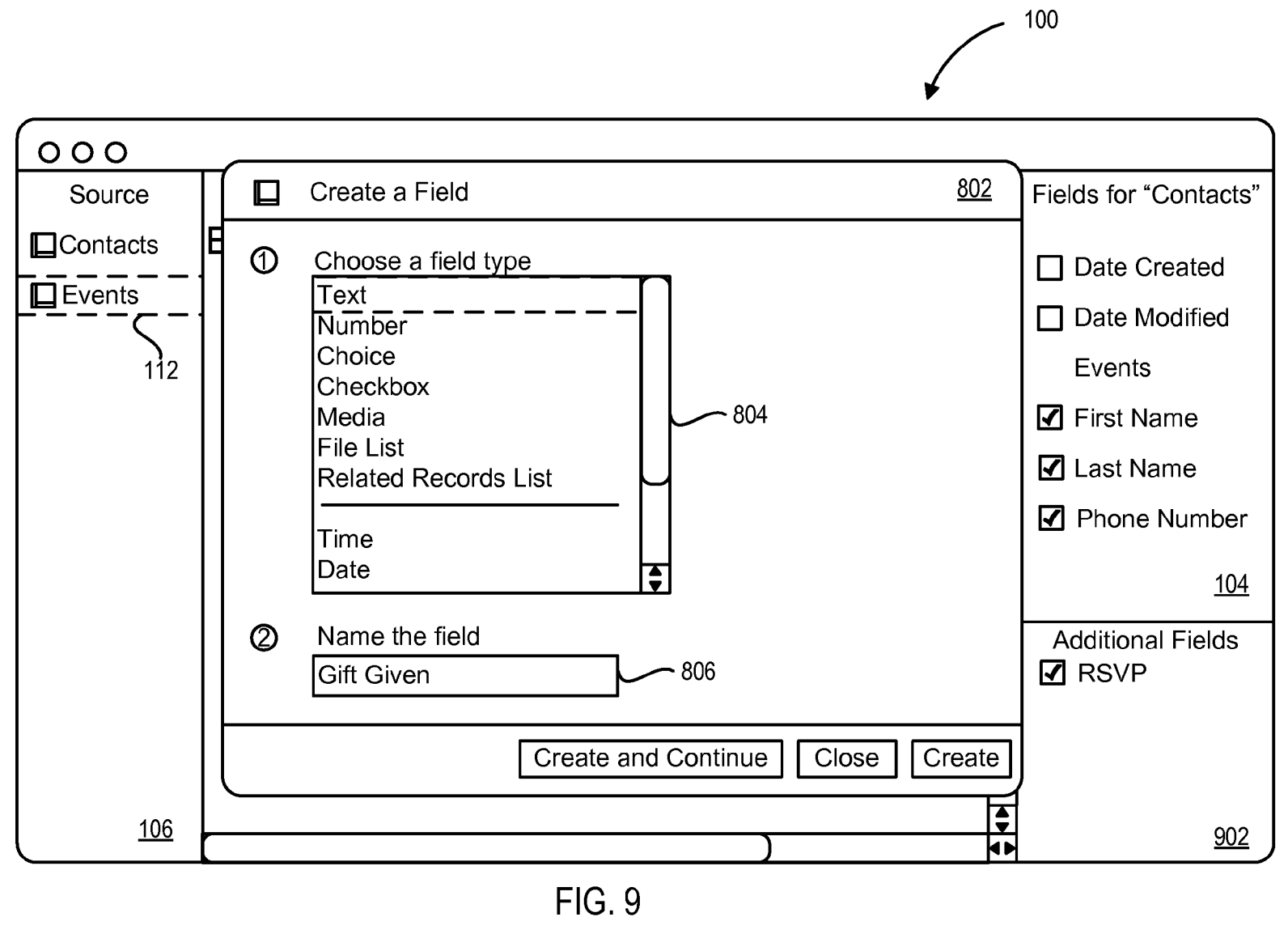

FIGS. 8 and 9 are screen shots showing example operations that can be used to automatically add additional fields to records in a related records list. In some implementations, it may be useful to avoid modifying a data source (e.g., the contacts table or the events table) because additional fields may not be relevant to all base records, but are relevant when considered in the presence of two or more related values. For example, in the absence of a contact being related to an event (or vice versa) an RSVP status is meaningless. However, adding an RSVP status for a particular contact (e.g., Maria Garza) with regard to a particular event (e.g., John and Jane's Wedding) may be useful. As another example, adding an additional field to store the quantity of a particular product (e.g., blue shirts) for a particular customer (e.g., Maria Garza) on a particular invoice may be useful. In other words, in some situations a user may want to keep track of information that is meaningful within the context of two pieces of information (e.g., an events and a contact), but not meaningful when stored in isolation. Rather than adding the field to the events table, or another similarly relevant table, the field can be added to a background table which cannot be directly accessed or modified by the user, as shown in FIG. 13B. Background tables are described in reference to FIGS. 12 and 13.

Referring to FIG. 5 and FIG. 8, in some implementations the user can display related information in the related record list 302 (e.g., contacts related to a selected event). The user can select a user interface button (e.g., button 502, shown in reference to FIG. 5) or use some other user interface operation (e.g., a pull down menu, keyboard short-cut, or a series of mouse clicks) on a user interface component, such as related records list 302. Responsive to the selection, the application 100 generates a user interface form 802 that allows the user to generate additional fields for the selected records. For example, the user can select a field type from user interface component 804 including a text field, a number field, a choice field, a checkbox field, a media field, a file list field, a related record list field, or other field types. The user can also name the field as appropriate in user interface component 806. Both the type of field and the name of the field can be stored in a database table. For example, a new table can be generated that includes both the type of field (e.g., checkbox) and the field name (e.g., RSVP). The generated table can be combined (e.g., joined using a MySQL® join command) with the appropriate background table (e.g., a table that specifies related fields) to specify how the table is extended with additional information.

Referring to FIG. 9, a second additional field is added to the related table. As described in reference to FIGS. 1A and 1B, the application allows the user to modify how the records are displayed. This is also true of the additional fields, as illustrated by user interface region 902. For example, the user can select the checkbox to determine if the additional RSVP field is displayed or not. Moreover, as illustrated by FIG. 9, the user is adding a text field named Gift Given. This information is also stored along with the checkbox named RSVP (e.g., described in reference to FIG. 8). In other words, the application 100 can reference a single background (e.g., joined) table to generate an appropriate view of the source table with the additional fields. For example, as illustrated in FIG. 10, a portion 1000 of the application 100 is shown. The wedding event is displayed with related contacts in the related records list 302. Additional fields corresponding to whether an RSVP has been received, and the gift received are also displayed in user interface component 302.

Moreover, as illustrated by FIG. 10, the possible values of the fields correspond to the type of additional field added. For example, because the RSVP field 1002 is a checkbox field type, as illustrated by FIG. 8, the value of the RSVP field 1002 can be either true or false which corresponds to a checked or an unchecked checkbox, respectively. As another example, the Gift Given field 1004 includes ASCII text, as specified by the text field type chosen as described in reference to FIG. 9. These additional field values are stored with respect to the contact and the event.

Example Process for Automatic Creation of Data Relationships

Figure 11:
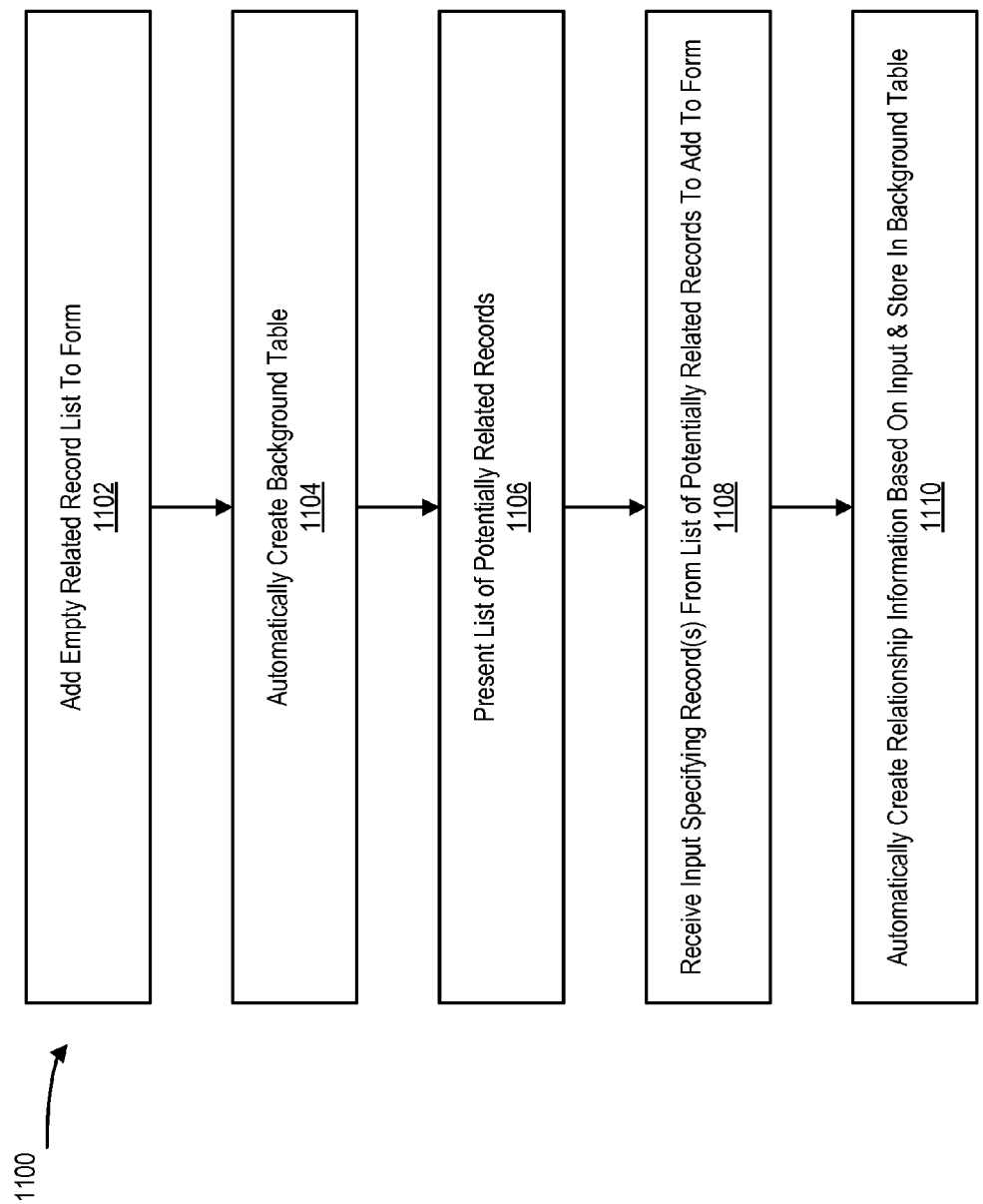
FIG. 11 is a flow chart showing an example process for automatically relating data.

FIG. 11 is a flow chart showing an example process 1100 for automatically relating data. In some implementations, the process 1100 receives user input indicative of an intent to create data relationships, creates background tables based on the received user input, automatically and transparently creates relationships derived from the user input, and stores the related data in the created tables. In some implementations, the process 1100 is executed after the user performs one or more operations. For example, as described in reference to FIG. 2, the process 1100 can be executed after the user drags-and-drops (e.g., as illustrated by arrow 206) the contacts data source onto the events form region 204. As another example, the process 1100 can be executed after the user initiates a dialog box-based operation to relate and display one data source with another (e.g., contacts with events in FIG. 2).

In step 1102, the process 1100 adds an empty related record list to the form. For example, in reference to FIG. 3, the process 1100 can generate an empty related record list (e.g., list 302) for the contacts data source. In step 1104, the application 100 automatically and transparently (e.g., transparent to the user) creates a data structure for storing information relating data from a first data source (e.g., a first source table) with data from a second data source (e.g., a second source table). In some implementations, the data structure is a background table. Background tables are described in more detail in reference to FIGS. 12 and 13. In some implementations, background tables cannot be directly accessed or modified by a user.

In step 1106, the process 1100 presents a list of potentially related records. In general, the process 1100 accesses the database displays a list of records from the data source. For example, in reference to FIG. 4, the application can present a list of potentially related records in user interface form 402.

In step 1108, the process 1100 receives input specifying one or more records form the related records list to add to the form. In the example of FIG. 4, the user can select records 406 and add them to form 302 using the user interface button 408. As another example, the user can drag the selected records 406 onto the form 302.

Figure 13A:
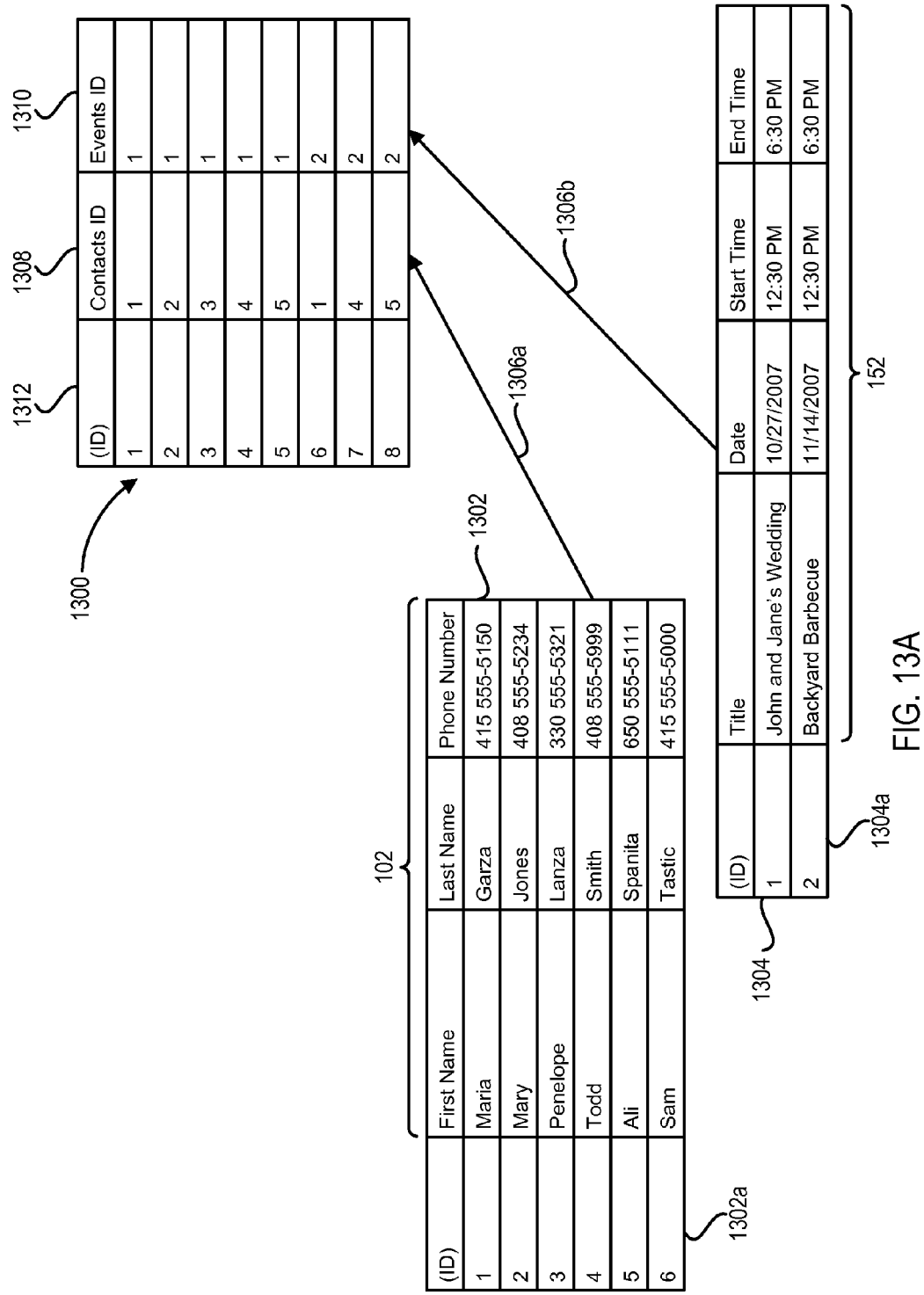
FIG. 13A illustrates an example background table that can be used to relate data.

In step 1110, the process 1100 automatically and transparently creates relationship information based on the received input and stores the relationships in one or more background tables. For example, if the input directs the process 1100 to relate one or more records with one or more other records, the process 1100 can store the record IDs in a background table (e.g., a join table), as described in reference to FIG. 13A. As another example, if the input directs the application to add additional fields to one or more records, the process 1100 can also store the additional fields in one or more background tables. FIG. 13B illustrates an example background table 1314 including joined data and additional fields. In the example shown, additional "RSVP" field 1316 and "Gift Given" field 1318 are added to the background table 1314. The additional field data would be available to be displayed as related records to Contacts records when showing which event each contact has RSVP'd to and what gift will be given at the event. Similarly, the additional field data would be available to be displayed as related records to Events records when showing which contacts will attend each event, and if the contacts RSVP'd and/or give gifts.

In some implementations, background tables can be used to store related data and additional or extended fields related to data records. For example, in reference to FIGS. 5 and 10, a background table can store both the contacts related to the event and additional RSVP and Gift Given fields (e.g., fields 1002 and 1004, respectively).

Example Database Architecture

Figure 12:
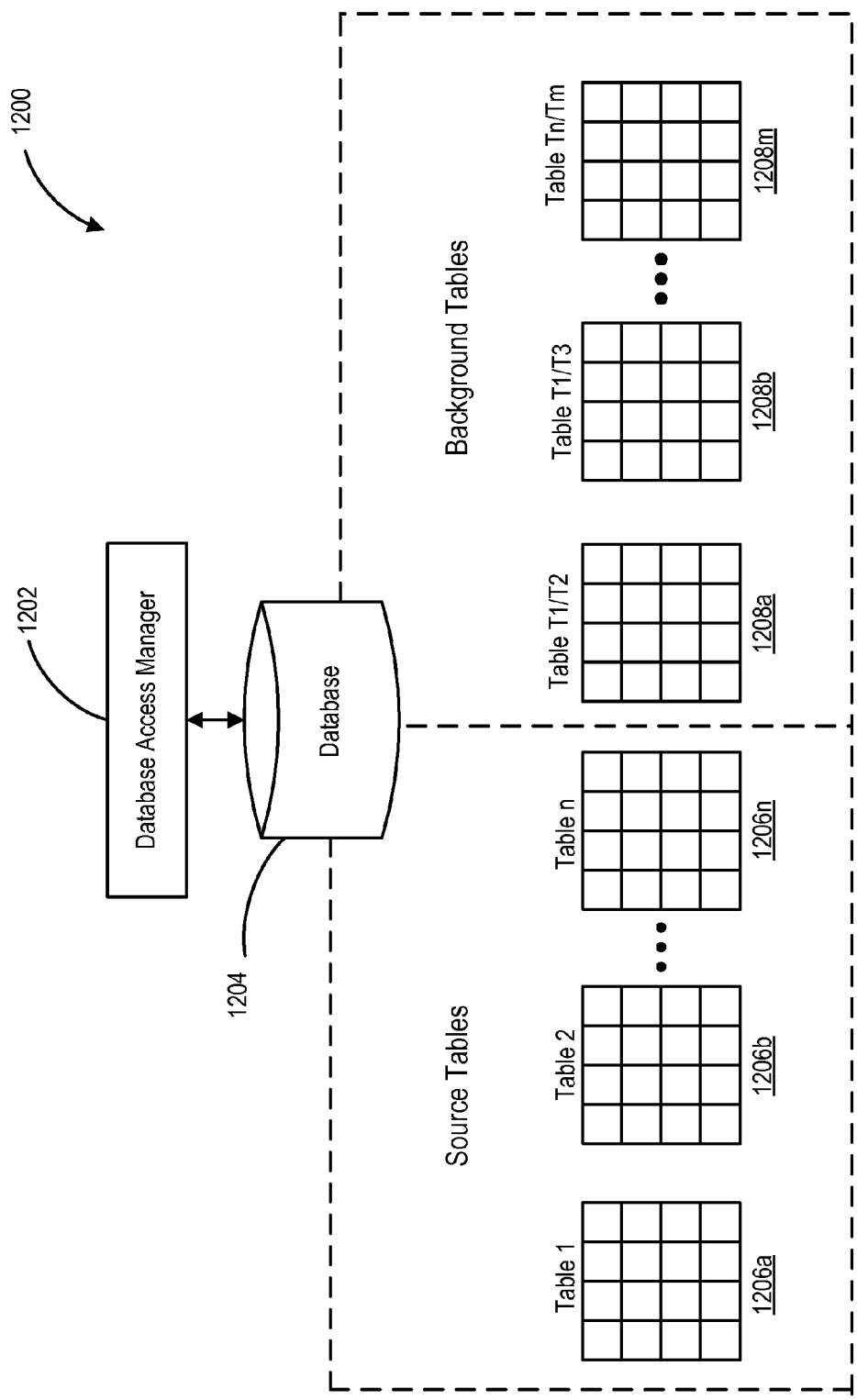
FIG. 12 is a block diagram showing an example generic database architecture that can be used to automatically relate data.

FIG. 12 is a block diagram showing a generic database architecture 1200 that can be used to automatically relate data. In general, the database architecture 1200 provides a data abstraction between one or more source tables 1206a-1206n and actions the user generates relating to the source tables 1206. Typically, the data abstraction is transparent to the user of the application 100.

In some implementations, the database architecture 1200 includes a database access manager 1202. The database access manager 1202 provides an interface between the application 100, or other applications, and the database 1204. For example, the database access manager 1202 can handle database queries including structure query language (e.g., MySQL®) queries, and other types of queries. Moreover, the database access manager 1202 can handle the creation of new database tables. For example, a new table can be created through a create command (e.g., SQL CREATE TABLE statement). For example, as shown in FIG. 2, the user drags and drops one data source onto another data source, causing a background table to be automatically created to store related records. In FIG. 4, the user adds related records simply by selecting them and adding them to the list. All of these actions cause SQL-based commands to occur, in order to store the relationship between the data.

The database 1204 is used to store information, typically in the form of source tables. The database 1204 can include any number of source tables. In the example shown, the database 1204 includes source tables 1206a through 1206n, where n is a positive integer. The database 1204 can also include any number of background tables. In the example shown, the database 1204 includes background tables 1208a through 1208m, where m is a positive integer.

The background tables 1208 can store data relationships and additional or extended fields to related records. The background tables 1208 are automatically and transparently created by the database access manager 1202 in response to user triggered events (e.g., a drag and drop event). In some implementations, users of the application 100 are not allowed access to the background tables 1208 and thus cannot directly access or modify the contents of the background tables 1208.

Example Background Table

FIG. 13A is a block diagram showing an example background table 1300 that can be used to store relationship information. In some implementations, the background tables 1208 can be created by joining one or more source tables 1206 to specify data relationships. For example, consider two source tables 1302 and 1304 which include data 102 and 152, respectively. In addition, the tables 1302 and 1304 include identifiers 1302a and 1304a, respectively, for each record. These identifiers are hidden from the user. Thus even though the tables 1302 and 1304 include identifiers, the application only displays data 102 and 152, respectively.

As illustrated by arrows 1306a and 1306b, the application 100 can store the relationship information by performing a join operation on tables 1302 and 1304 (e.g., using an SQL Join command). This creates the background table 1300 where the contact IDs are associated with the events IDs. For example, the contact IDs 1302a can be stored in the contact ID field 1308 and the event IDs 1304a can be stored in the event ID field 1310 of the background table 1300 in order to relate the records from each source that the user has associated using actions like those described in reference to FIGS. 4-5.

In some implementations, the application 100 can also store added field information in background table 1300. For example, the application 100 can add additional or extended fields (not shown) to the background table 1300 that specifies if a contact has sent a gift and/or RSVP to the host of the event. The values of the additional fields can be specified by user input. The values of the additional fields can be determined from the values entered into the related records list 302, as illustrated by FIG. 10.

Example System Architecture

Figure 14:
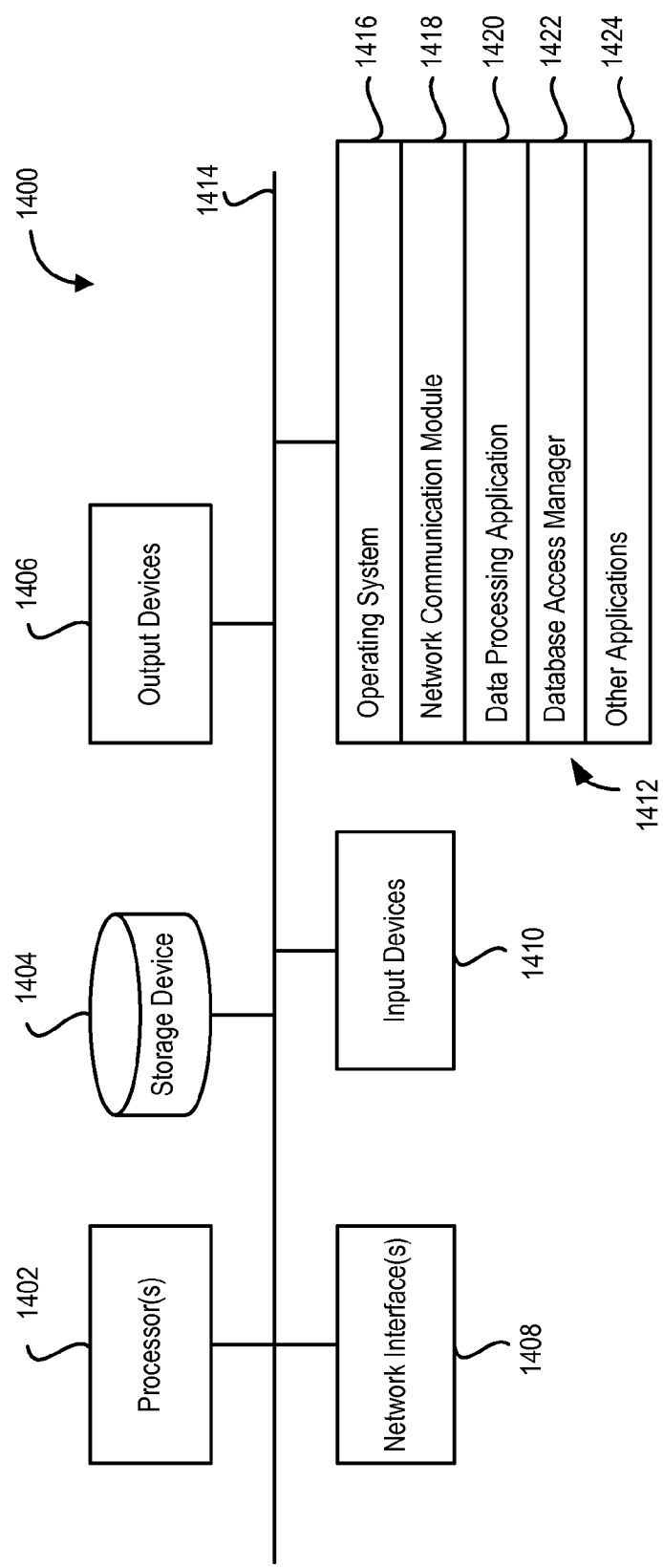
FIG. 14 is a block diagram showing an example generic computing architecture that can be used to automatically relate data.

FIG. 14 is a block diagram showing a generic computing architecture 1400 (e.g., a personal computer) that can be used to automatically relate data, as described in reference to FIGS. 1-13. The architecture 1400 generally includes one or more processor(s) 1402, one or more storage device(s) 1404 (e.g., hard disk, optical disk, CD-ROM), one or more output devices 1406 (e.g., display device), one or more network interface(s) 1408 (e.g., Ethernet card, WAN adapter, USB port), one or more input devices 1410 (e.g., mouse, keyboard), and memory 1412 (e.g., RAM, ROM). The memory 1412 may include an operating system 1416, a network communication module 1418, one or more data processing application 1420 (e.g., an RDBMS), a database access manager 1202, and one or more other applications 1424. Each of these components can be operatively coupled to one or more buses 1414 for transferring and receiving instructions, addresses, data and control signals.

In some implementations, the database management system 1420 can be a cross-platform database application that integrates a database engine with a graphical user interface for allowing users to modify a database by dragging new elements into layouts, screens and forms that provide the user interface. The database management system 1420 interacts with the database access manager 1422 to implement the features and operations described in reference to FIGS. 1-13.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, a data processing apparatus. The computer-readable medium can be a machine-readable storage device, a machine-readable storage substrate, a memory device, a composition of matter affecting a machine-readable propagated signal, or a combination of one or more them. The term "data processing apparatus" encompasses all apparatus, devices, and machines for processing data, including by way of example a programmable processor, a computer, or multiple processors or computers. The data apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications may be made to the disclosed implementations and still be within the scope of the following claims.

What is claimed is:

1. A method comprising:
    obtaining a first input from a first user interface for relating data from a first data source to data from a second data source;
    obtaining a second input from the first user interface, the second input specifying the data from the second data source; and
    automatically relating the data from the first data source to the data from the second data source, where at least one of a data abstraction of the first data source or a data abstraction of the second data source is transparent in the first user interface, and relating the data includes:
       generating information relating the data from the first data source to the data from the second data source based on the second input; and
       storing the information in a data structure.

2. The method of claim 1, where obtaining the first input further comprises:
    obtaining a drag-and-drop input for dragging and dropping an object representing the first data source into the user interface or obtaining an option selection input from a dialog box presented in the user interface.

3. The method of claim 1, where the first data source is a first database table and the second data source is a second database table.

4. The method of claim 3, further comprising:
    joining the first and second database tables to form the data structure for storing the information.

5. The method of claim 4, where automatically generating information further comprises:
    automatically generating one or more identifiers for associating data in the first database table with data in the second database table; and
    storing at least one identifier in the data structure.

6. The method of claim 1, further comprising:
    presenting specified data from the second data source in the user interface.

7. The method of claim 1, further comprising:
    obtaining a third input from a second user interface for relating the data from the second data source to the data from the first data source;
    responsive to the third input, providing for display a second user interface element operable to specify data from the first data source, where the second user interface element provides access to the first data source using the information stored in the data structure; and
    obtaining a fourth input from the second user interface element specifying data from the first data source.

8. The method of claim 7, further comprising:
    presenting specified data from the first data source in the second user interface.

9. The method of claim 1, further comprising:
    obtaining a third input specifying an additional data record related to the first data source or the second data source; and
    responsive to the input, adding the additional data record to the data structure.

10. The method of claim 1, where relating the data from the first data source to the data from the second data source includes relating the data sources and corresponding records directly without requesting a user to manually create relationships between the data sources.

11. A system comprising:
    a data processing application operable for receiving user-generated trigger events, the trigger events operable to create data relationships;
    a database operable for coupling with the data processing application and including one or more data structures for storing relationship data; and
    a data access manager operable for coupling to the data processing application and the database, the data access manager operable for automatically relating first data from a first data source and second data from a second data source in response to the user-generated trigger events, where at least one of a data abstraction of the first data source or a data abstraction of the second data source is transparent to a user, and relating the data includes:
       generating the relationship data; and
       storing the relationship data in the one or more data structures.

12. The system of claim 11, where the data processing application is a relational database management system.

13. The system of claim 12, where the one or more data structures further comprise a background database table joining the first data source and second data source.

14. A non-transitory computer-readable medium having instruction stored thereon, which, when executed by a processor, causes the processor to perform operations comprising:
    obtaining a first input from a first user interface for relating data from a first data source to data from a second data source;
    obtaining a second input from the first user interface, the second input specifying the data from the second data source; and
    automatically relating the data from the first data source to the data from the second data source, where at least one of a data abstraction of the first data source or a data abstraction of the second data source is transparent in the first user interface, and relating the data includes:
       generating information relating the data from the first data source to the data from the second data source based on the second input; and
       storing the information in a data structure.

15. The non-transitory computer-readable medium of claim 14, where obtaining the first input further comprises:
    obtaining a drag-and-drop input for dragging and dropping an object representing the first data source into the user interface.

16. The non-transitory computer-readable medium of claim 14, where the first data source is a first database table and the second data source is a second database table.

17. The non-transitory computer-readable medium of claim 16, further comprising:
  joining the first and second database tables to form the data structure for storing the information.

18. The non-transitory computer-readable medium of claim 17, where automatically generating further comprises:
  automatically generating one or more identifiers for associating data in the first database table with data in the second database table; and
  storing at least one identifier in the data structure.

19. The non-transitory computer-readable medium of claim 14, further comprising:
  presenting specified data from the second data source in the user interface.

20. The non-transitory computer-readable medium of claim 14, further comprising:
  obtaining a third input from a second user interface for relating the data from the second data source to the data from the first data source; and
  obtaining a fourth input from the second user interface specifying data from the first data source.

21. The method of claim 1, where storing the information in the data structure includes storing the information in a transparently created background table.

22. The method of claim 1, where obtaining the first input comprises receiving a drag-and-drop input dragging and dropping an object representing the second data source into the user interface.

23. The method of claim 22, further comprising providing for display a related records list in response to the drag-and-drop input.

24. The method of claim 23, where the related records list is originally blank, even when the second data source includes one or more items.

25. The method of claim 24, further comprising providing for display a control element in association with the originally blank related records list, the control element operable to receive a third input and, in response to the third input, causing the one or more items included in the second data source to be displayed.

* * * * *